United States Patent Office 3,194,838
Patented July 13, 1965

3,194,838
PROCESS FOR PREPARATION OF α-HYDROXY-β-ALKYL-AMINONAPHTHALENE
Daniel L. Ross, Cambridge, Mass., assignor to Polaroid Corporation, Cambridge, Mass., a corporation of Delaware
No Drawing. Filed Feb. 19, 1962, Ser. No. 174,247
5 Claims. (Cl. 260—573)

This invention relates to novel chemical compounds and more particularly to certain novel chemical compounds useful as azo couplers.

One objects of this invention is to provide novel chemical compounds and suitable syntheses for their preparation.

Another object of this invention is to provide novel azo couplers for use in preparing novel dyes.

Other objects of the invention will in part be obvious and will in part appear hereinafter.

The invention accordingly comprises the several steps and the relation and order of one or more of such steps with respect to each of the others, and the products and compositions possessing the features, properties and the relation of elements which are exemplified in the following detailed disclosure, and the scope of the application of which will be indicated in the claims.

For a fuller understanding of the nature and objects of the invention, reference should be had to the following detailed description.

The novel chemical compounds of this invention may be represented by the formula:

(I)

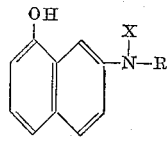

wherein R is an alkyl radical, and X is hydrogen or an alkyl radical. The alkyl radicals are preferably lower alkyl radicals, for example, methyl, ethyl, propyl, isopropyl. The term "alkyl" is also intended to include substituted alkyl radicals such as hydroxyethyl, as well as unsubstituted radicals.

The compounds within this invention may be prepared generally by reacting 1,7-dihydroxynaphthalene with a primary or secondary aliphatic amine.

This invention permits the preparation of a large number of novel substituted aminonaphthol compounds by reacting the desired primary or secondary amine with 1,7-dihydroxynaphthalene in a suitable solvent for the amine.

It should be noted that the preparation of the novel compounds of this invention doe not involve the use of sulfite, in contrast to the Bucherer reaction which involves converting, for example, β-naphthol to β-napthylamine (p. 791, Feiser and Feiser, Organic Chemistry, 2nd edition, D. C. Heath and Company, Boston, Massachusetts, 1950).

The novel compounds of this invention may also be prepared by the lithium aluminum hydride reduction of a 2-acylamido-8-naphthol.

As example of novel compounds within the scope of this invention mention may be made of:

(I)
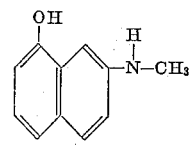
2-methylamino-8-naphthol (II)
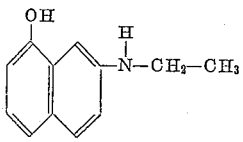
2-ethylamino-8-naphthol (III)
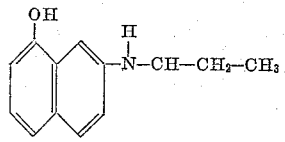
2-propylamino-8-naphthol (IV)
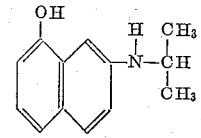
2-isopropylamino-8-naphthol (V)
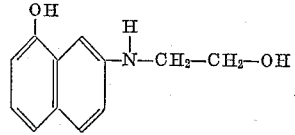
2-β-hydroxyethylamino-8-naphthol The following nonlimiting examples illustrate the preparation of compounds within the scope of this invention:

Example 1

40 g. (0.25 mole) of 1,7-dihydroxynaphthalene, 43.5 ml. (0.5 mole) of 40% aqueous methylamine and 50 ml. of water were placed in a 300 ml. bomb which was then sealed and heated and rocked at 150° C. for 8 hours. The contents of the bomb were then mixed with 100 ml. of 50% sodium hydroxide solution and 300 ml. of water and filtered through a bed of Celite. 200 ml. of concentrated hydrochloric acid was added to the filtrate which was then cooled to room temperature and filtered. The resulting residue was stirred with 75 ml. of water and filtered. The two filtrates were combined and neutralized with saturated ammonium carbonate solution. The resulting grey-white solid was collected by filtration, washed with 250 ml. of water and dried over potassium hydroxide in a vacuum dessicator. The product, 2-methylamino-8-naphthol, a light grey solid, weighed 19.6 g. and melted at 123–126° C.

Example II 2-ethylamino-8-naphthol was prepared according to the procedure of Example I, substituting ethylamine for methylamine.

Example III 2-isopropylamino-8-naphthol was prepared as the hydrochloride according to the procedure of Example I using isopropylamine for methylamine. After the acidification step, the mixture was brought to a boil and then cooled to room temperature. The resulting gummy residue was isolated and stirred with 500 ml. of ethyl acetate and then crystallized from boiling 5% hydrochloric acid with charcoal and isolated as grey-green needles melting at 196–200° C., with decomposition.

In addition to the above-described synthetic process comprising reacting a primary or secondary aliphatic-amine with 1,7-dihydroxy-naphthalene, 2-β-hydroxyethyl-amino-8-naphthol can also be prepared by the following synthetic procedure.

Example IV

A mixture of 5.30 g. (0.05 mole) of sodium carbonate, 100 ml. of water and 10 ml. of dioxane was prepared, to which was added with stirring 15.92 g. (0.1 mole) of 2-amino-8-naphthol. To the resulting suspension, 14.30 g. (0.1 mole) of chlorethylchloroformate was added with stirring over a period of 30 minutes. After stirring for three hours, the mixture was poured into 300 ml. of water containing 100 ml. of concentrated hydrochloric acid. The resulting product, 8-hydroxy-2-naphthyl-N-(β-chloroethyl)-carbamate was collected, dried, and crystallized from 900 ml. of dichloroethane and melted at 175–178° C. 11.14 g. of the carbamate compound was added to a deaerated solution of 11.8 g. of potassium hydroxide in 105 ml. of ethanol. The mixture was refluxed for two hours, cooled to room temperature, filtered, and concentrated to dryness under reduced pressure. The resulting residue was dissolved in 210 ml. of water and 50 ml. of concentrated hydrochloric acid. The solution was filtered and the filtrate was neutralized with ammonium carbonate. The resulting precipitate was collected and recrystallized by dissolving in water at 80° C., filtering and cooling. The product, 2-β-hydroxyethylamino-8-naphthol, was separated and melted at 112–114° C.

The following nonlimiting example illustrates an alternate method of preparation of compounds within the scope of this invention, i.e., the lithium aluminum hydride reaction.

Example V

To a suspension of 2 g. of lithium aluminum hydride in 50 ml. of dry tetrahydrofuran was added, over 20 minutes, a solution of 5.03 g. of 2-acetamido-8-naphthol in 75 ml. of tetrahydrofuran. The mixture was stirred under reflux for 15 hours. A solution of 2 ml. of water in 20 ml. of tetrahydrofuran was then added slowly to the mixture with cooling, and the mixture was then evaporated to dryness under reduced pressure. The residue was heated with two 100 ml. portions of acetic acid and filtered. The acetic acid extracts were then evaporated to dryness. The residue was stirred with 200 ml. of 6 N-hydrochloric acid. The extract was filtered through Celite and neutralized with ammonium carbonate. The resulting product, 2-ethylamino-8-naphthol, was washed and dried.

The novel compounds of this invention are useful as couplers in the formation of azo dyes, and particularly in preparing dye developers as disclosed and claimed in the copending application of Milton Green, Terry W. Milligan, and Daniel L. Ross, Serial No. 174,248, filed February 19, 1962. When the novel couplers of this invention are used in preparing the dye developers of the above-cited application, it has been found desirable to protect the hydroxyl group of the naphthol coupler to avoid undesirable side reactions and to direct the position in which coupling takes place. Preferably the hydroxyl group is protected by acylation preferably by an acyloxy group, more preferably an acetoxy group, which may subsequently be removed, prior to photographic employment, by hydrolysis. Dyes prepared from the novel couplers of this invention, such as those of the above-noted copending application, exhibit a high degree of light stability and possess unexpected non-desensitization characteristics.

The novel compounds of this invention are also useful as color couplers.

The novel protected couplers of this invention may be represented by the formula:

(2)

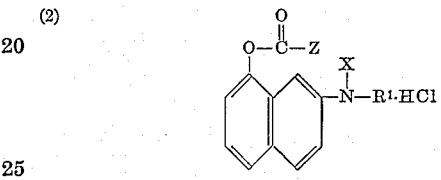

wherein Z is a lower alkyl radical, preferably methyl or ethyl, X is hydrogen or an alkyl radical, and $R^1$ is an alkyl radical. The term "alkyl" is again intended to include substituted, as well as unsubstituted, alkyl radicals. It should be understood that when the substituted alkyl radical $R^1$ contains a hydroxyl radical it also will be the protected derivative, e.g.

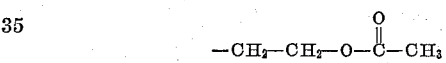

which may subsequently be removed, if desired, by hydrolysis.

The novel protected couplers of this invention are prepared by reacting aminonaphthol with acetyl chloride in glacial acetic acid in the presence of hydrogen chloride gas.

The following nonlimiting examples illustrate the preparation of the protected couplers within the scope of this invention.

Example VI 7.28 g. (0.042 mole) of 2-methylamino-8-naphthol was added to 72 ml. of flacial acetic acid saturated with gaseous hydrochloric acid. The mixture was stirred for 30 minutes with gaseous hydrochloric acid bubbling through the solution and with the addition of 14.5 ml. of acetyl chloride. The solution was then heated to 44–55° C. for 105 minutes with gaseous hydrochloric acid bubbling through the solution, and was then poured, with stirring, into a liter of anhydrous ether. The light grey precipitate, 8-acetoxy-N-methyl-2 - naphthylamine hydrochloride, was separated, washed with ether, and dried. The product melted at 153–156° C.

Example VII

8 - acetoxy-N-ethyl- 2 - naphthylamine hydrochloride, melting at 136–138° C., was prepared according to the procedure of Example VI from 2-ethylamino-8-naphthol.

Example VIII 8-acetoxy-N-isopropyl-2-naphthylamine hydrochloride, melting at 179–181° C., was prepared according to the procedure of Example VI from 2-isopropylamino-8-naphthol.

Example IX 8-acetoxy-8 (β-acetoxyethyl)-2-naphthylamine hydrochloride was prepared from 2 - β-hydroxyethylamino - 8- naphthol according to the procedure of Example VI, melted at 128–129.5° C., and showed the following analysis:

|  | C | H | N | Cl |
|---|---|---|---|---|
| Calculated | 59.35 | 5.60 | 4.33 | 10.95 |
| Found | 58.84 | 5.68 | 4.84 | 10.63 |

Since certain changes may be made in the above processes and products without departing from the scope of the invention herein involved, it is intended that all matter contained in the above description shall be interpreted as illustrative and not in a limiting sense.

What is claimed is:

1. The process of selectively replacing the β-hydroxy group of 1,7-dihydroxynaphthalene with an alkyl amino group which comprises heating in a bomb a reaction mixture consisting essentially of (a) an amine selected from the group consisting of primary and secondary aliphatic amines; (b) 1,7-dihydroxynaphthalene; and (c) water, and recovering a compound of the formula:

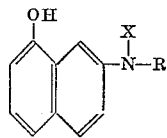

wherein R is a lower alkyl radical and X is selected from the group consisting of hydrogen and lower alkyl radicals, 2. A process as defined in claim 1 wherein said amine is methylamine.
3. A process as defined in claim 1 wherein said amine is ethylamine.
4. A process as defined in claim 1 wherein said amine is isopropylamine.
5. A process as defined in claim 1 wherein said amine is hydroxyethylamine.

References Cited by the Examiner
UNITED STATES PATENTS

| 2,053,818 | 9/36 | Felix | 260—199 XR |
| 2,163,639 | 6/39 | Bramer | 260—574 XR |
| 2,572,284 | 10/51 | Schoen | 260—575 XR |
| 2,657,983 | 11/53 | Hill et al. | 99—163 |
| 2,733,273 | 1/56 | Rigterink | 260—488 |
| 2,835,635 | 5/58 | Mayhew et al. | 260—410.5 |

OTHER REFERENCES

Fieser et al.: "Organic Chemistry," third edition, New York, p. 742 (1956).

References Cited by the Applicant

Journal of Organic Chemistry, volume 29 (May 1964), pages 1180–1183.

LORRAINE A. WEINBERGER,
*Acting Primary Examiner.*

ABRAHAM H. WINKELSTEIN, LEON ZITVER,
*Examiners.*